(12) United States Patent
Hannington

(10) Patent No.: US 6,468,378 B1
(45) Date of Patent: Oct. 22, 2002

(54) REAR PROJECTION SCREENS AND LIGHT FILTERS WITH CONFORMABLE COATING AND METHODS OF MAKING THE SAME

(75) Inventor: Michael Hannington, Madison, OH (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/535,203

(22) Filed: Mar. 27, 2000

Related U.S. Application Data

(62) Division of application No. 09/329,040, filed on Jun. 9, 1999.
(60) Provisional application No. 60/088,591, filed on Jun. 9, 1998.

(51) Int. Cl.[7] .............. B44C 1/20; B32B 33/00; B05D 5/06; B41M 3/12; G03B 21/56
(52) U.S. Cl. .............. 156/230; 156/242; 156/247; 156/276; 156/298; 427/148; 427/163.1; 427/163.3; 428/204; 428/210; 428/143; 428/325; 428/488.4; 359/456; 359/614
(58) Field of Search ........................ 156/230, 240, 156/231, 232, 242, 241, 247, 272.2, 272.8, 276, 298; 427/162, 163.1, 163.3, 163.4, 164, 165, 203, 146, 147, 148; 428/143, 210, 142, 204, 212, 414, 325, 488.4; 359/452, 453, 460, 613, 614

(56) References Cited

U.S. PATENT DOCUMENTS

| | | | |
|---|---|---|---|
| 1,998,054 A | 4/1935 | McBurney | 88/24 |
| 2,213,077 A | 8/1940 | Schwartz | 88/24 |
| 2,378,252 A | 6/1945 | Staehle et al. | 88/28.93 |
| 3,200,702 A | 8/1965 | Giordano | 88/24 |
| 3,383,153 A | 5/1968 | Vetter | 350/126 |
| 3,552,822 A * | 1/1971 | Altman | 353/44 |
| 3,795,435 A | 3/1974 | Schwab | 350/105 |
| RE28,274 E | 12/1974 | Altman | 353/44 |
| 3,953,635 A * | 4/1976 | Dunning | 428/151 |
| 4,367,920 A | 1/1983 | Tung et al. | 350/105 |
| 4,505,967 A | 3/1985 | Bailey | 428/164 |
| 4,511,210 A | 4/1985 | Tung et al. | 350/105 |
| 4,569,857 A | 2/1986 | Tung et al. | 427/163 |
| 4,648,932 A | 3/1987 | Bailey | 156/276 |
| 4,660,930 A | 4/1987 | Van Der Hoorn et al. | 350/126 |
| 4,688,093 A | 8/1987 | Van Der Staak et al. | 350/128 |
| 4,766,032 A * | 8/1988 | Pernicano | 428/325 |
| 4,950,525 A * | 8/1990 | Baily | 428/164 |
| 5,122,906 A | 6/1992 | Wheatley | 359/586 |
| 5,563,738 A | 10/1996 | Vance | 359/614 |
| 5,629,783 A | 5/1997 | Kanbara et al. | 349/70 |
| 5,681,660 A * | 10/1997 | Bull et al. | 428/500 |
| 5,781,344 A | 7/1998 | Vance | 359/614 |
| 6,076,933 A | 6/2000 | DiLoreto et al. | 359/614 |
| 6,261,402 B1 * | 7/2001 | Watanabe et al. | 156/230 |

* cited by examiner

*Primary Examiner*—Richard Crispino
*Assistant Examiner*—J. A. Lorengo
(74) *Attorney, Agent, or Firm*—Renner, Otto, Boisselle & Sklar, LLP

(57) ABSTRACT

This invention relates to a light transmitting filter comprising (a) light absorbing layer having a first and second surface, (b) microspheres embedded in the light absorbing layer and (c) an optically clear, substantially uniform, conformable layer covering the microspheres, wherein the microspheres provide light tunnels through the light absorbing layer. The invention also relates to methods of making the same. The invention also relates to a method of preparing a light transmitting filter comprising the step of laminating a clear substantially uniform conformable layer over transparent microspheres embedded in a light absorbing layer wherein the transparent bead form light tunnels through the light absorbing layer. The light transmitting filters of the present invention have improved light throughput and improved angularity.

17 Claims, 6 Drawing Sheets

REAR PROJECTION SCREENS AND LIGHT FILTERS WITH CONFORMABLE COATING AND METHODS OF MAKING THE SAME

CROSS REFERENCE TO PROVISIONAL APPLICATION

This application is a division of Ser. No. 09/529,050, filed Jun. 9, 1999, which claims priority from provisional application Ser. No. 60/088,591, filed Jun. 9, 1998, the entire disclosure of which is hereby incorporated by reference.

FIELD OF THE INVENTION

The invention relates to rear projection screens and light filters, specifically those with a conformable coating over transparent microspheres.

BACKGROUND OF THE INVENTION

Rear projection screens transmit an image from the back of the screen to the viewer on the opposite side of the screen. The image is affected by the amount of light transmitted by the screen or filter or throughput. Generally, screens and filters have been limited by their construction to the amount of light transmitted through the screen or filter. It is desirable to have construction which would provide increased light throughput.

Generally, rear projection screens have suffered from poor angularity. Angularity is the term used to describe the ability of a viewer to see a good image from the screen or filter at some angles other than those which are ordinary to the screen surface. As the viewer moves to the side of the screen or filter, the image quality is decreased. It is desirable to have screens and filters which have improved angularity.

U.S. Pat. Nos. 5,563,738 and 5,781,344, issued in the name of Vance, relate to light transmitting and dispersing filters having low reflectance.

The multi-layer light filters use the addition of optical layers to a basic refractive light filter to allow adjustment of gain, contrast and ambient light rejection of light filters.

SUMMARY OF THE INVENTION

This invention relates to a light transmitting filter comprising (a) light absorbing layer having a first and second surface, (b) transparent microspheres embedded in the light absorbing layer and (c) an optically to clear, substantially uniform, conformable layer covering the transparent microspheres, wherein the transparent microspheres provide light tunnels through the light absorbing layer. The invention also relates to methods of making the same. The invention also relates to a method of preparing a light transmitting filter comprising the step of laminating a clear substantially uniform conformable layer over transparent microspheres embedded in a light absorbing layer wherein the transparent microspheres form light tunnels through the light absorbing layer. The light transmitting filters of the present invention have improved light throughput and improved angularity.

BRIEF DESCRIPTION OF THE DRAWINGS

FIGS. 1b and 1c are expanded views of the cross section of a portion of FIG. 1a.

DETAILED DESCRIPTION OF THE PREFERRED EMBODIMENTS

Figure 1A:
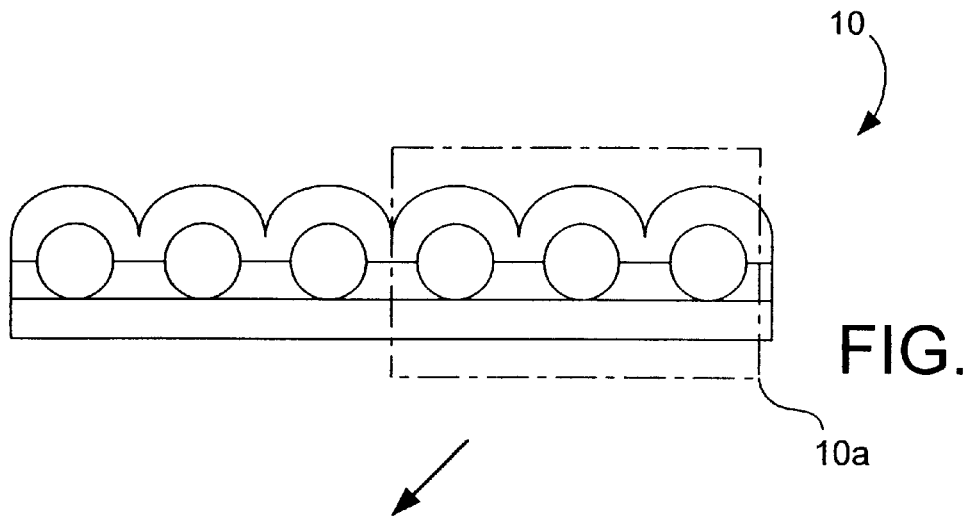
FIGS. 1a, 1b, and 1c are cross sectional areas of the light transmitting filter, where

As used in the specification and claims the term substantially uniform refers to a layer of the construction which has a thickness with little variance, such as a variation in thickness of less than about 5 microns, preferably a variation of less than about 2.5 microns, or preferably less than about 1.25 microns. Here and elsewhere in the specification and claims, the range and ratio limits may be combined.

The term conformable refers to a layer which matches the surface of the transparent microspheres. In other words the layer conforms or cups the transparent microspheres.

As described above the present invention is directed to a light transmitting filter comprising (a) light absorbing layer having a first and second surface, (b) transparent microspheres embedded in the light absorbing layer and (c) an optically clear, substantially uniform, conformable layer covering, wherein the microspheres provide light tunnels through the light absorbing layer.

The first layer of the light transmitting filter is a light absorbing layer.

This layer generally has a thickness sufficient for embedding the transparent microspheres. The embedding of the transparent microspheres may be at any level provided that the transparent microspheres form a light tunnel through the light absorbing layer. Preferably, the light absorbing layer has a thickness from about 10% to 90% of the transparent microsphere diameter. The light absorbing layer may be any material which is substantially opaque and can be embedded with the transparent microspheres and form light tunnels. The light absorbing layer may be any material which is malleable enough to give way when the transparent microspheres are pushed against it, such as a partially or incompletely crosslinked urethane, a pressure sensitive adhesive, or with the addition of heat, thermoplastic polymers. The light absorbing material may also be a material which forms around the transparent microsphere, such as an asphalt or adhesive (a pigmented pressure sensitive adhesive).

Typically, the light absorbing layer is a combination of a pigment, usually carbon black, and a polymer, such as a polyolefin, polyacrylatepolyvinylbutyral, such as Butvar resin available from Solutia, polyurethanes, polyesters or polyvinylcarboxylate. The polyolefins may be homopolymers and copolymers of $C_{2\text{-}12}$ olefins, such as ethylene, propylene, and butylene. The polyacrylates and polymethacrylate may be homopolymers or copolymer of $C_{1\text{-}12}$ acrylate or methacrylate monomers, such as methyl, ethyl, propyl, butyl, hexyl, or octyl acrylates or methacrylates. Here and elsewhere in the specification and claims, the term for pendant groups is meant to include all isomeric forms of the group. For instance, the use of the term octyl is intended to cover- n-octyl, isooctyl, and 2-ethylhexyl groups. The polyvinylcarboxylates include homo or copolymers of $C_{1\text{-}12}$ vinyl carboxylates, such as vinyl acetate, vinyl propionate and vinyl butyrate.

In one embodiment, the light absorbing layer is supported by a an optically clear support layer. The optically clear support layer may be a glass or a polymer. The support layer must resist the pressure exerted by the transparent microspheres during the embedding and conforming processes. The support layer is adhered to the light absorbing layer by adhesive, lamination, with or without the layer, or as a result of coextrusion. The support layer may be any material having sufficient strength to provide support to the light absorbing layer and have optically clear characteristics. Examples of support layers include glass, polyacrylics, polycarbonates, polyurethanes, such as two part polyurethanes, and polyesters, such as polyethylene terephthalates. Transparent microspheres are embedded into the light absorbing layer. Typically the transparent microspheres are embedded to a level sufficient to provide light tunnels through the light absorbing layer. Generally, the transparent microspheres are embedded at a level of about 10% to about 80%, preferable less than about 50% (preferably from about 30% to about 40%) of their diameter. The transparent microspheres generally have a refractive index from about 1.5 to 2.3, or from about 1.5 to about 2.2, or from about 1.65 to about 1.95. 3 They are typically composed of glass, ceramic, plastic or other suitably transparent materials. Transparent microspheres from about 25 to about 300 microns are suitable for construction of light filters as described herein. In one embodiment, the transparent microspheres have a diameter of about 30 to about 120, or from about 40 to about 80, or from about 50 to 65 microns. In one embodiment, the diameter is an average diameter. In one embodiment, the transparent microspheres are substantially uniform in size. The transparent microspheres are present in substantially a monolayer generally covering from 60% to about 91% of the surface area of the assembly, or from about 75% to about 90%, or from about 85% to about 90% of the surface area.

The third component of the light transmitting filter is the optically clear, substantially uniform conformable layer. This layer typically has a thickness of about 10% to about 90% of the diameter of the average microsphere, or from about 20% to about 80%, or from about 30% to about 70% of the diameter of the average microsphere. The layer comprises any polymer which has the optical clarity needed for light transmitting filters. Typically these polymers are polyolefins, such as optically clear polyolefins from metallocene catalysts, polyacrylates, polymethacrylates, polycarbonates, polyurethanes, polyesters, such as polyethylene terephthates, polyvinylidene dichloride, cellophane, cellulose acetate, polyvinylidene difluoride, polyvinyl chloride, polyvinyl butyral, and polyvinylcarboxylates. These polymers have been described above.

In one embodiment, the light filter has a tie layer to improve the adhesion of the conformable coating to the transparent microspheres and the light absorbing layer. This is any material which improves this adhesion. In another embodiment, the transparent microspheres and the light absorbing layer may be treated to improve adhesion. Examples of suitable tie layer resins include "Platamid", available from Elf Atochem, "CXA", available from DuPont, and "Plexar" available from Chemplex.

The methods of making the light transmitting filters may be through heat lamination. It is essential that the substantially uniform conformable layer is formed on the transparent microspheres. The Inventor has discovered that the vicat softening point of the polymer of the conformable layer must be higher than the vicat softening point of the molding layer. The molding layer is in contact with the conformable polymeric layer during preparation of the light filter. The molding layer may be any thermoplastic polymer with the appropriate vicat softening point. If the molding layer is composed of a polymer of similar nature to the conformable layer then a layer of silicone release layer, such as those used for pressure sensitive adhesive liners, may be used to enhance ease of separation of the layers. In one embodiment, the molding layer is composed of polyolefins, such as low, medium and high density polyethylene, propylene or mixtures thereof. The lower vicat softening point of the molding layers helps form the conformable layer by softening and/or melting to conform to the surface of the transparent microspheres. Under the pressure and temperature of preparation the molding layer presses the conformable layer against the transparent microspheres.

Figure 1B:
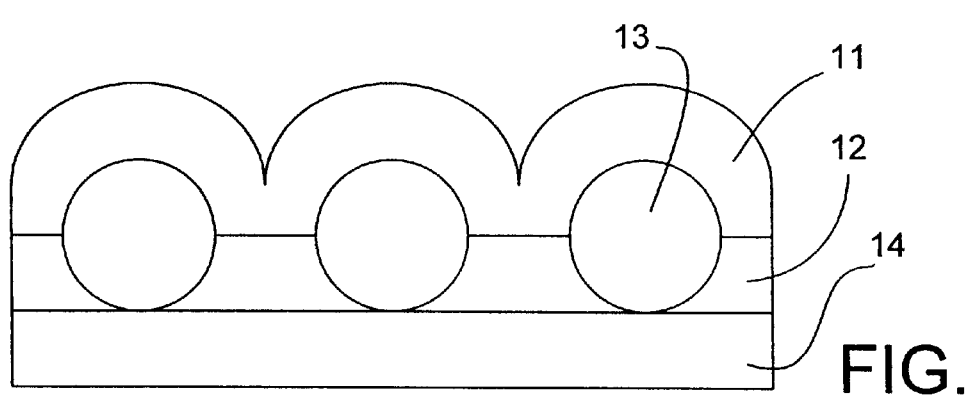
Figure 1C:
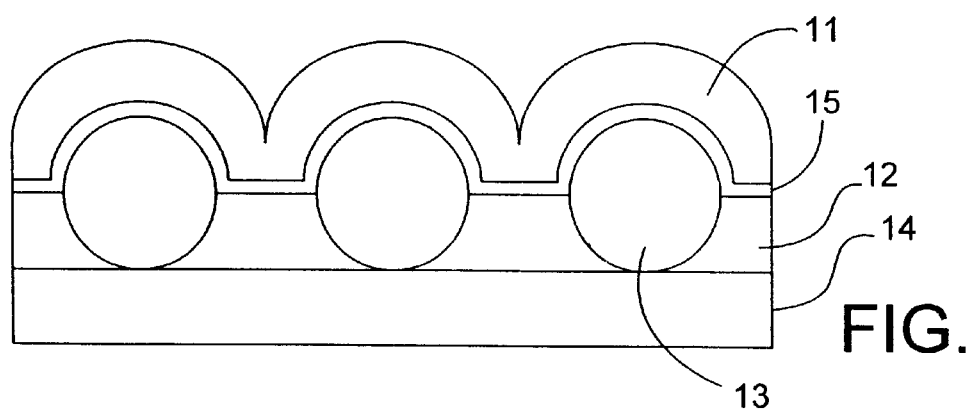
Figure 2:
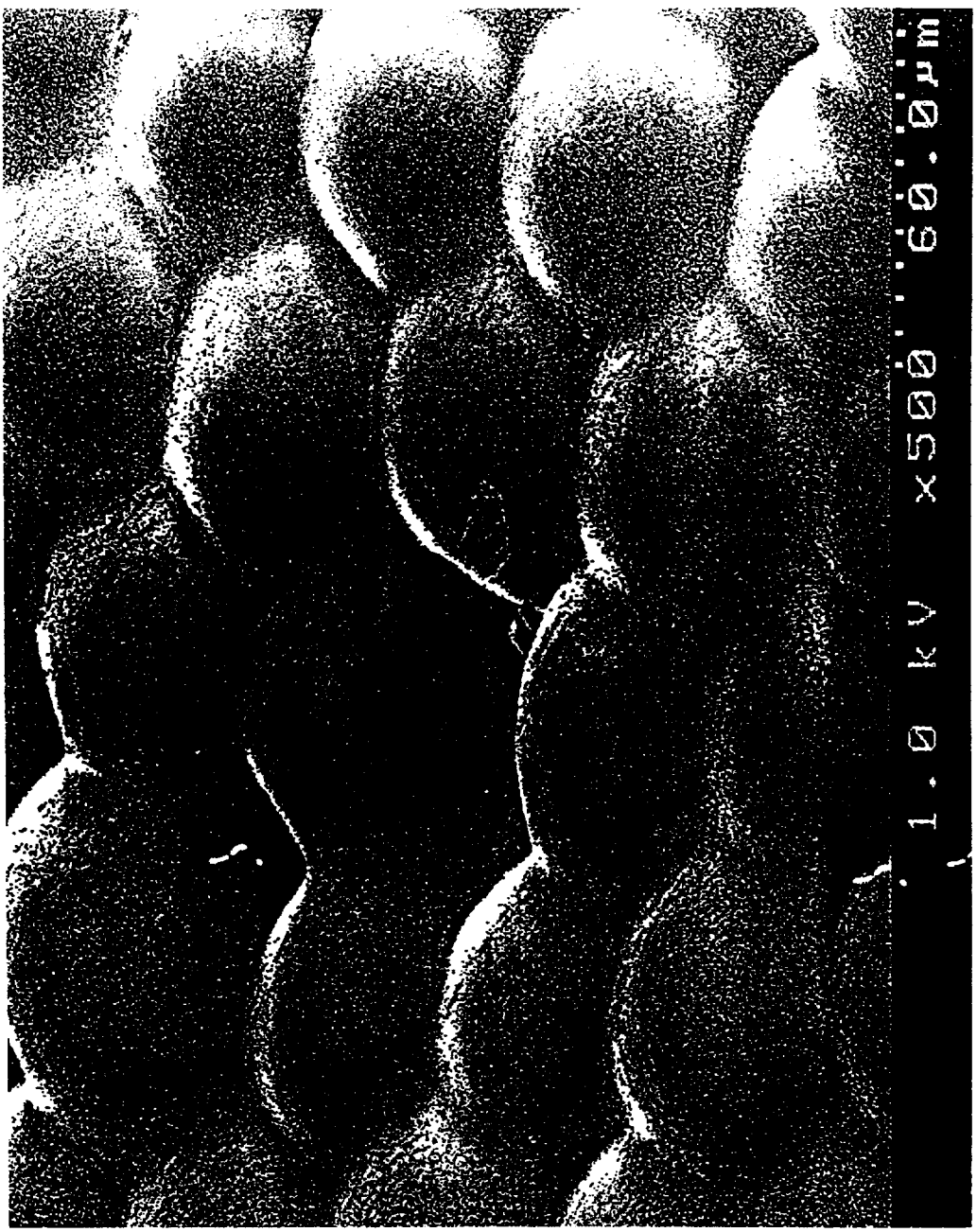
FIG. 2 is a photomicrograph of the top surface of the light transmitting filter of the present invention.

The invention may be further understood by reference to the attached figures. FIG. 1a contains a cross section of light filter 10. Box 10a is expanded in FIG. 1b to show a conformable coating 11, light absorbing layer 12, transparent microspheres 13 and clear support layer 14. FIG. 1c represents another embodiment where conformable coating 11 is attached to tie layer or corona treatment layer 15. The light filter still contains light absorbing layer 12, transparent microspheres 13 and clear support layer 14.

Figure 3A:
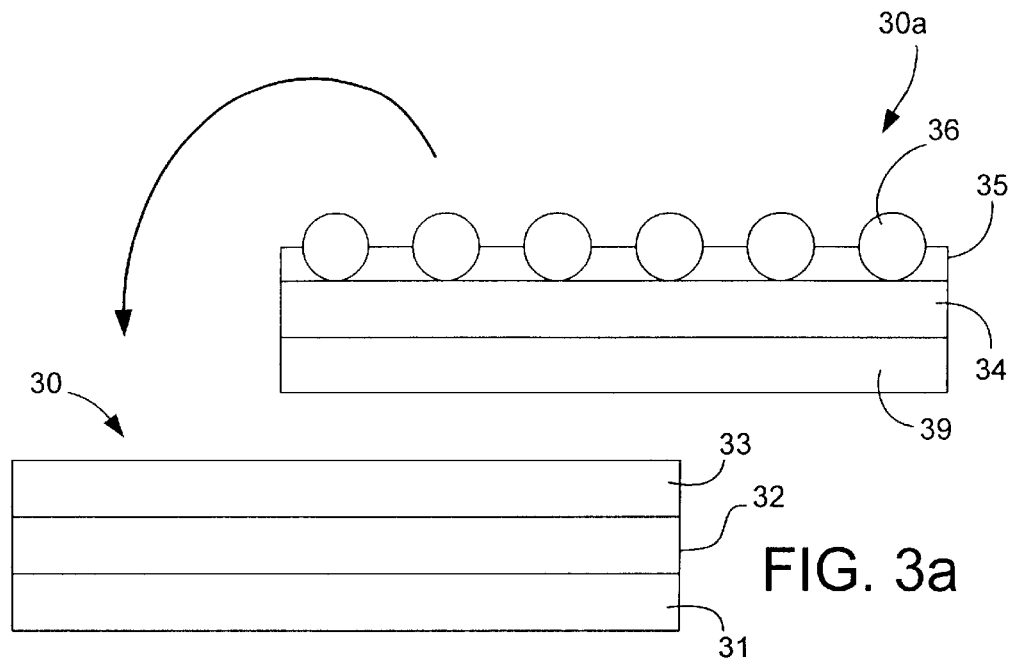
FIGS. 3a–3c are cross sectional views of one embodiment of the method of making the light transmitting filter.
Figure 3B:
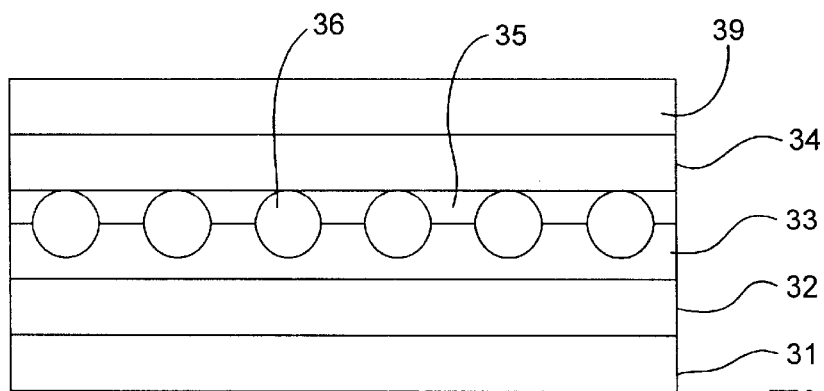
Figure 3C:
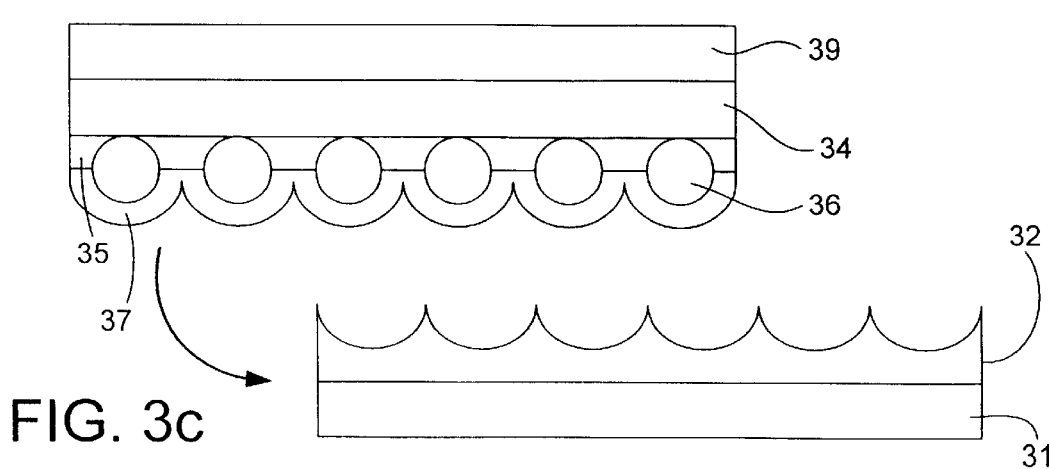

FIG. 3a is a method of preparing the light filters. Construction 30 contains layer 33, which comprises the composition of the conformable coating, layer 32 which is a molding layer, and layer 31 which is the substrate layer (typically paper or PET film such as Mylar®). Construction 30a contains transparent microspheres 36 embedded in light absorbing layer 35 on support layer 34 (in one embodiment, a polyacrylate) and removable support layer 39 (typically paper or PET film). Constructions 30 and 30a are laminated together as shown in FIG. 3b. Lamination temperatures and pressures depend on the materials (polymers) used but preferably the lamination occurs at a temperature from about 175 to about 400° F., or from about 250 to about 350° F. The laminating pressure is preferably between about 50 to about 150, or from about 75 to about 125 pounds per square inch. After lamination and shown in FIG. 3b, a construction having support layer 34 in contact with transparent microspheres 36 and light absorbing layer 35. The transparent microspheres 36 and light absorbing layer 35 are also in contact with the layer 33 which is the composition of the conformable coating. Layer 33 is in contact with molding layer 32 and support layer 31. As shown in FIG. 3c, the layers 31 and 32 are removed leaving a light filter with conformable coating 37 over transparent microspheres 36, which are embedded in light absorbing layer 35, which is supported by layers 34 and 39. Removable support layer 39 is present to provide support during manufacture and processing. It is typically removed before the light filter is used.

Figure 4A:
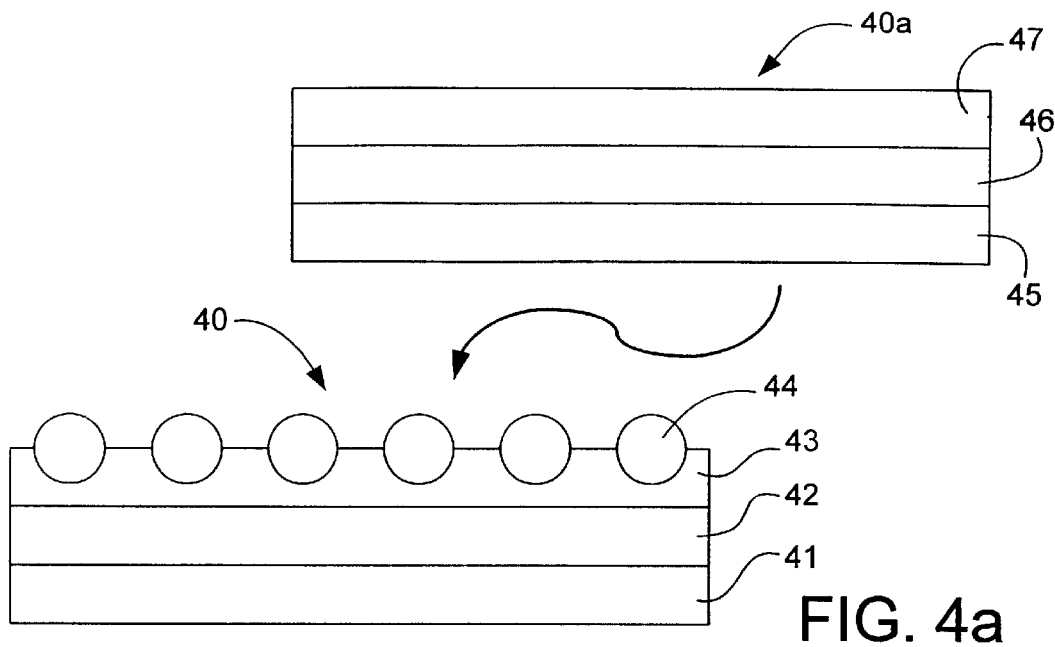
FIGS. 4a–4c are cross sectional views of another embodiment of a method of making the light transmitting filter.
Figure 4B:
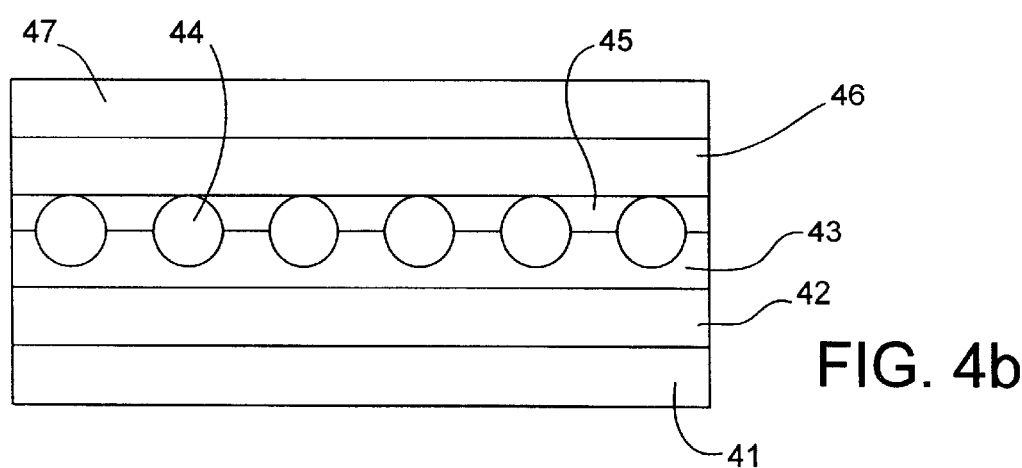
Figure 4C:
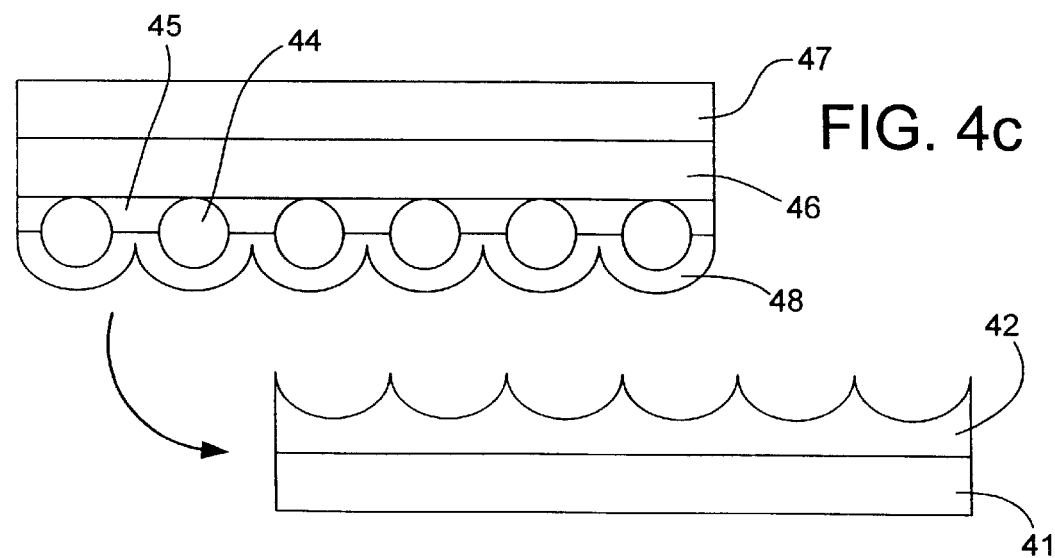

An alternative means for preparing the light filter is shown in FIGS. 4a–4c. Construction 40 comprises support layer 41 and molding layer 42 laminated to layer 43, which is composed of the materials for the conformable coating, and having transparent microspheres 44 embedded therein. Construction 40a comprises a light absorbing layer 45, clear support layer 46 (e.g. a polyacrylate) and removable support layer 47 (e.g. paper or PET film). Construction 40 and 40a are brought together with heat and pressure as described herein. After constructions 40 and 40a is have been combined, FIG. 4b represents a multilayer construction which comprises support layer 41 on molding layer 42 which in turn is in contact with layer 43 which is the composition of the conforming coating. Transparent microspheres 44 are embedded in light absorbing layer 45 and in contact with clear support layer 46 to form light tunnels. A portion of the multilayer construction is removed and as illustrated in FIG. 4c. In FIG. 4c, support layer 41 and molding layer 42 are removed from the construction. The remaining portion of the construction comprises removable support layer 47 and clear support layer 46 which is in contact with transparent microspheres 44 to form light tunnels. Support layer 47 is removed before using the light filter. The transparent microspheres are embedded in the light absorbing layer 45. A conformable coating 48 covers the transparent microspheres 44 and light absorbing layer 45.

Figure 5A:
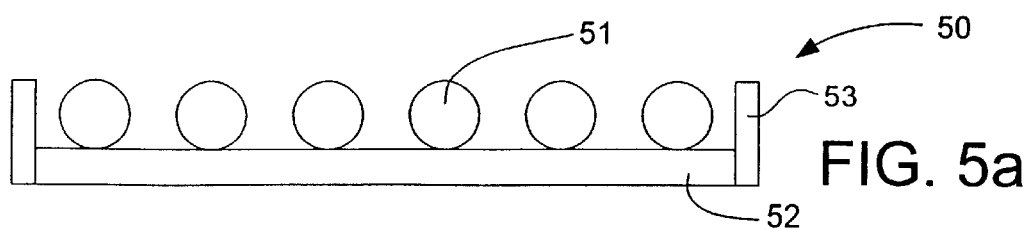
FIGS. 5a–5f are cross sectional views of another embodiment of a method of making the light transmitting filter.
Figure 5B:
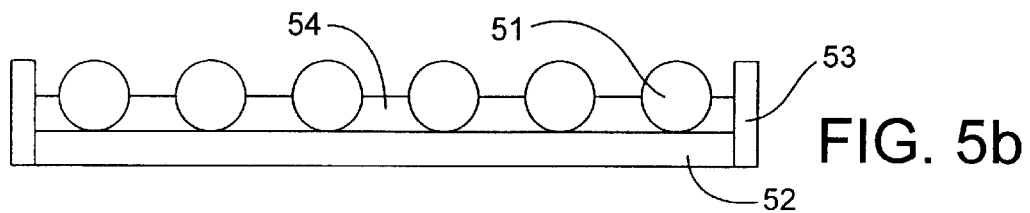
Figure 5C:
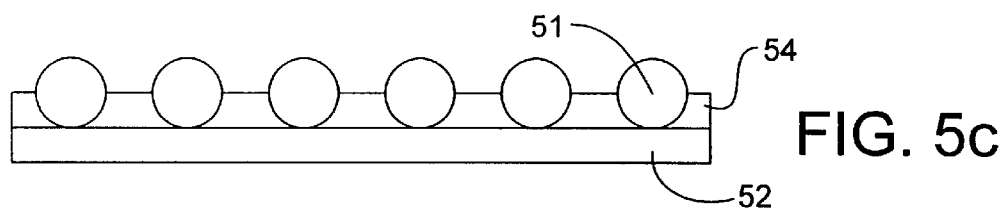
Figure 5D:
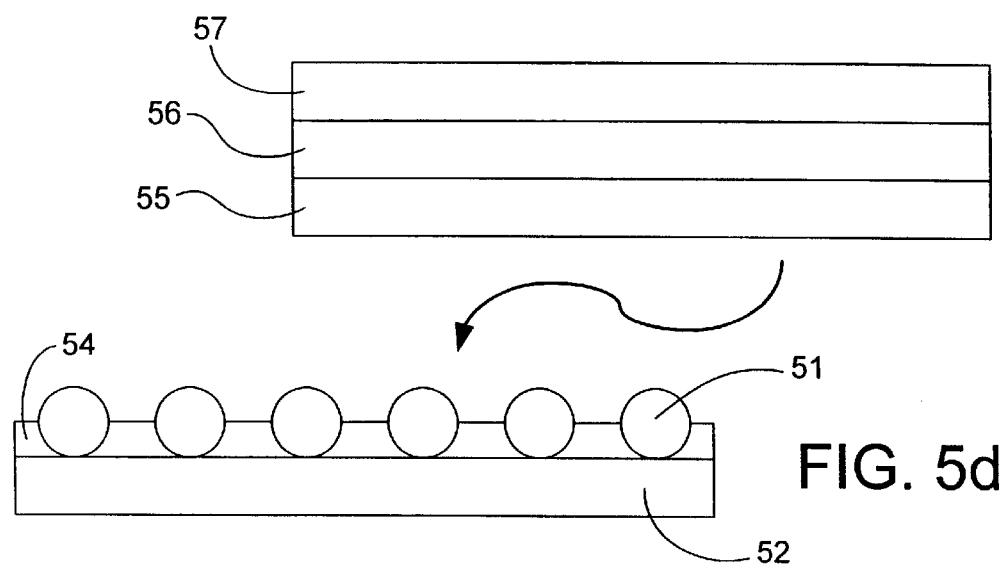
Figure 5E:
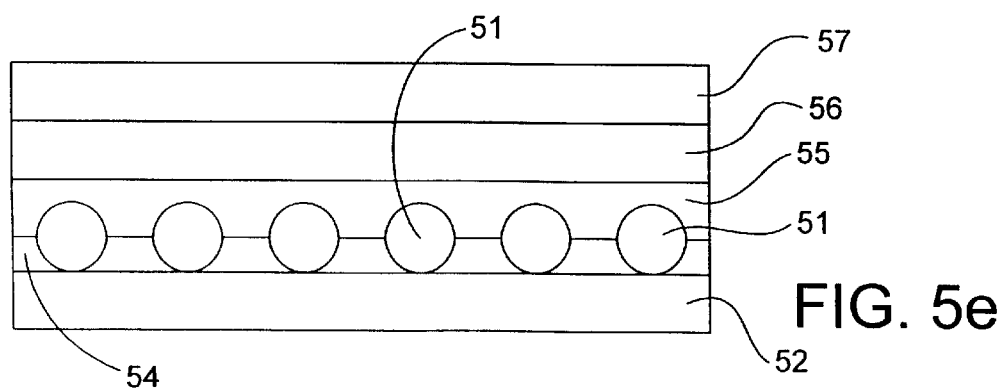
Figure 5F:
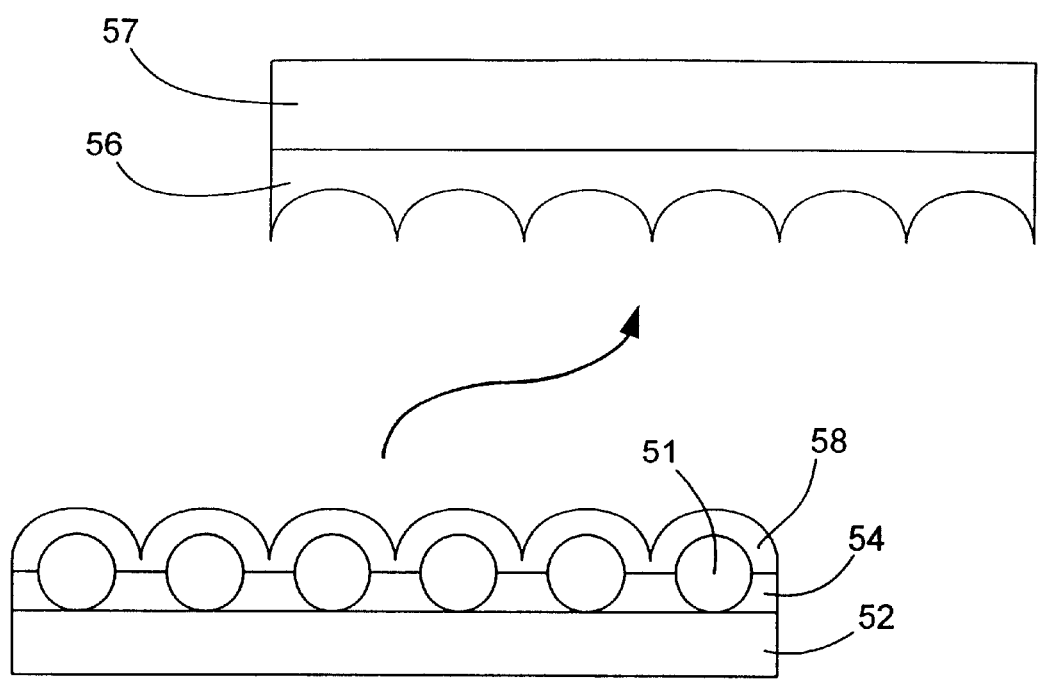

Another means of preparing the light filter is shown in FIGS. 5a–5f. In FIG. 5a, transparent microspheres 51 are placed on a clear support layer 52 and within retainers 53. In FIG. 5b, light absorbing material, such as asphalt or black pressure sensitive adhesive is placed between the transparent microspheres 54. FIG. 5c shows the transparent spheres 51 set in the light absorbing material 54 and on support layer 52 without retainers 53. FIG. 5d shows lamination of the construction from FIG. 5c to a construction comprising layer 56 which is the composition of the conformable coating, molding layer 55 and support layer 57. The resulting construction is illustrated in FIG. 5e and comprises a clear support layer 52 in contact with glass microspheres 51 to form light tunnels through light absorbing layer 54. Light absorbing layer 54 and the transparent microspheres 51 are in contact with the layer 55 which is the composition of the conformable coating. The layer 55 is in contact with molding layer 56 and support layer 57. Support layer 57 and molding layer 56 are removed from the multilayer construction of FIG. 5e. A portion of layer 55 is removed with the molding layer 56 and support layer 57. The other portion of the construction comprises a clear support layer 52 and transparent microspheres 51 in contact to form light tunnels through light absorbing layer 54. Over the transparent microspheres and light absorbing layer 54 is conformable coating 58.

Following are examples of light filters. These examples are illustrative and are not be considered limiting to the scope of the invention.

Example 1

A 75 micron layer of polyethylene terephthalate is laminated to a 75 micron layer of polymethylmethacrylate. A 10 micron layer of black polyvinylbutyral is placed on top of the polymethylmethacrylate. Glass microspheres having a refractive index of 1.80 and having an average diameter of 52 microns are embedded into the polyvinylbutyral forming a light tune to make construction 1. A paper facestock is coated with 35 microns of low density polyethylene. Onto the layer of polyethylene is placed a 20 micron thick layer of clear polyvinylbutyral to make construction 2. Construction 1 and 2 are pressed together at a temperature of 285° F. and 100 psi using a roll laminator. After cooling the paper and the low density polyethylene are separated from the other materials. The polyethylene terephthalate is removed from the polymethylmethacrylate layer to provide a light filter with a conformable coating.

Example 2

A paper is coated with 35 microns of low density polyethylene and 20 layer of clear polyvinylbutyral. Glass microspheres of example 1 are embedded in the polyvinylbutyral to form light tunnels. This construction is then laminated to a construction comprising of a 75 micron layer of polyethylene terephthalate coated with 75 microns of polymethylmethacrylate and 10 microns of black polyvinylbutyral at 100 psi and 285° F. The paper and the polyethylene as well as the polyethylene terephthalate are removed to form the light filter with a conformable coating.

Example 3

Glass microspheres of Example 1 are placed on a layer of polymethylmethacrylate supported by a layer of polyethylene terephthalate.

Black pressure sensitive adhesive is added to a level of about 40% of the diameter of the glass microspheres. A 20 micron layer of clear polyvinylbutyral on low density polyethylene coated paper is laminated to the transparent microspheres in the pressure sensitive adhesive at a temperature of 230° F. and 80 psi. The paper and polyethylene as well as polyethylene terephthalate are removed to leave the desired light filter with a conformable coating.

The light filter may be adhered to a rigid structure, such as sheet polycarbonate (Lexan$^a$) or polymethylmethacrylate (Plexiglas$^a$).

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. The method of making a light transmitting filter comprising the steps of (1) providing (a) a first assembly comprising a light absorbing layer having a first and second surface, and a monolayer of transparent microspheres embedded in the light absorbing layer, wherein the microspheres provide light tunnels through the light absorbing layer; and (b) a second assembly comprising an optically clear, highly conformable layer, a molding layer, and a substrate; (2) laminating the microsphere containing surface of the first assembly to the optically clear highly conformable surface of the second assembly; and (3) removing the substrate and molding layer, where the conformable layer remains on the microspheres, follows the curved surfaces of the microspheres, and is substantially uniform.

2. The method of claim 1 wherein the microspheres are embedded in the light absorbing layer by placing the microspheres on a substrate and partially surrounding the microspheres with a light absorbing material.

3. The method of claim 1 in which the Vicat softening point of the molding layer is less than that of the optically clear conformable layer.

4. The method of claim 1 in which in which the light absorbing layer has a thickness from about 10% to 80% of the microsphere diameter.

5. The method of claim 1 in which the transparent microspheres which provide light tunnels through the light absorbing layer are present in substantially a monolayer generally covering from 60% to about 90% of the surface area of the assembly.

6. The method of claim 1 in which the transparent microspheres which provide light tunnels through the light absorbing layer are have a refractive index from about 1.5 to about 2.3.

7. The method of claim 1 in which the transparent microspheres have an average diameter from about 25 to about 300 microns and vary in diameter through a range less than 50% of the average diameter of the microspheres.

8. The method of claim 1 wherein the conformable layer comprises a polymethacrylate or polyvinylcarboxylate.

9. The method of claim 1 further comprising a polymeric tie layer between the clear conformable layer and the first surface of the light absorbing layer.

10. The method of claim 1 further comprising a silicone release layer between the clear conformable layer and the molding layer.

11. A method of preparing a light transmitting filter comprising the steps of:

(1) providing a first construction comprising molding layer having a first and second surface, a support layer on the first surface of the molding layer, and an optically clear polymeric layer on the second surface of the molding layer, wherein the Vicat softening point of the optically clear polymeric layer is greater than the Vicat softening point of the molding layer, (2) providing a second construction comprising a light absorbing layer with a first and second surface, and a support layer on the first surface of the light absorbing layer, (3) heat laminating the optically clear polymeric layer of the first construction to the second surface of the second construction, (4) removing the support layer and molding layer from the laminate, provided that either the first or second construction contains transparent microspheres and the transparent microspheres form light tunnels through the light absorbing layer.

12. The method of claim 11 wherein the molding layer is a polyolefin and the support layer is a paper or polymeric liner.

13. The method of claim 11 wherein the light absorbing layer comprises polymethacrylate or polyvinylcarboxylate and at least one pigment, and the support layer is paper or a polymeric liner.

14. The method of claim 11 wherein transparent microspheres are embedded in the light absorbing layer.

15. The method of claim 11 wherein the transparent microspheres are embedded in the optically clear polymeric layer.

16. The method of claim 11 further comprising a polymeric tie layer on the optically clear polymeric layer.

17. The method of claim 16, wherein the transparent microspheres are embedded in the tie layer.

* * * * *